(12) United States Patent
Pauly

(10) Patent No.: US 6,449,556 B1
(45) Date of Patent: Sep. 10, 2002

(54) METHOD AND APPARATUS FOR DESIGNATING WAYPOINTS ON A NAVIGATIONAL DISPLAY

(75) Inventor: Martin Pauly, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/552,215

(22) Filed: Apr. 19, 2000

(51) Int. Cl.⁷ ............................................. G01B 21/00
(52) U.S. Cl. .................. 701/206; 701/300; 701/201; 701/120; 701/14
(58) Field of Search ............................... 701/206, 207, 701/300, 302, 201, 120, 14, 4

(56) References Cited

U.S. PATENT DOCUMENTS

| | | | | |
|---|---|---|---|---|
| 4,086,632 A | * | 4/1978 | Lions | 701/210 |
| 4,413,322 A | * | 11/1983 | Foster et al. | 701/206 |
| 4,692,869 A | * | 9/1987 | King et al. | 701/206 |
| 4,893,127 A | * | 1/1990 | Clark et al. | 342/386 |
| 5,715,163 A | * | 2/1998 | Bang et al. | 701/11 |
| 5,884,223 A | * | 3/1999 | Tognazzini | 701/301 |

OTHER PUBLICATIONS

Collins Pro Line 4 Avionics System Pilot's Guide for the Challenger 604, First Edition, Sep. 22, 1997, pp. 4–41 and 4–42.

* cited by examiner

Primary Examiner—Jacques H. Louis-Jacques
Assistant Examiner—Brian J. Broadhead
(74) Attorney, Agent, or Firm—Nathan O. Jensen; Kyle Eppele

(57) ABSTRACT

A navigation system such as a flight management system allows operator-defined waypoints to be selected. A pilot waypoint can be selected via an interface which provides a place-bearing-distance label when the waypoint is not on a flight plan. The label is in an along-track-distance format when the waypoint is on the flight plan. The labels provide information in a fashion consistent with Air Traffic Control (ATC) phraseology.

19 Claims, 11 Drawing Sheets

METHOD AND APPARATUS FOR DESIGNATING WAYPOINTS ON A NAVIGATIONAL DISPLAY

FIELD OF THE INVENTION

The present invention relates generally to a navigational display system. More particularly, the present invention relates to a navigational display system which accepts user selectable waypoints. The navigational display system can be a graphical flight management system (FMS).

BACKGROUND OF THE INVENTION

Navigational display systems are utilized in a variety of mobile applications to aid in the driving, piloting, or operation of various mobile platforms. Navigational display systems include a screen or monitor which displays a graphical representation of a map, flight plan, or route. Mobile platforms which utilize navigational display systems include airplanes, helicopters, cars, trains, boats, ships, vehicles, or other means of travel.

In one example of a navigational system, a graphical flight management system (FMS) includes a display and a joystick. The display provides a map including a navigational plan, such as, a graphical representation of a flight plan. The flight plan is often represented on the display by a line connecting various points along the expected route of travel.

Waypoints are often utilized on the navigational display so the operator can prepare for or execute particular maneuvers at particular points along the navigation plan. Waypoints can correspond to points or locations on a map. A waypoint is defined in a navigational database that is part of the flight management computer (FMC). An operator-defined waypoint is not defined in the navigation database and its specification is entered manually into the FMS by the operator or pilot.

An operator-defined waypoint can be generated by utilizing a joystick to manipulate a cursor on the display and by selecting the waypoint via a button once the cursor is over the desired location. In conventional navigational systems, such as, FMS, the display provides a graphical representation or map of the area surrounding the airplane. The present location of the airplane is represented by an airplane symbol at the center of the map. The display also provides a flight plan (e.g., represented as a solid line connecting points on the itinerary). The airplane is typically located on the flight plan.

The cursor is coupled to a center point of the map (the airplane symbol) via a dotted, rubberized line. A textual reading is provided next to the cursor which indicates a radial distance and angle from the center of the map. However, the reading can only provide a distance and angle reference with respect to the center of the map (airplane symbol). Once the waypoint is selected via a button, the flight management computer (FMC) of the flight management system converts the waypoint to a latitude/longitude coordinate pair which is displayed next to the waypoint. The latitude/longitude coordinate pair is not consistent with Air Traffic Control (ATC) phraseology.

In navigational applications, operator-defined waypoints are necessary in a number of situations. For example, in an avionics application, Air Traffic Control (ATC) often instructs a pilot to cross a point prior to a destination at a particular altitude. More particularly, a pilot my receive instructions stating "cross 20 miles prior to Atlanta at 11,000 feet." To ensure compliance with the instruction, the pilot desires to define a waypoint on the flight plan 20 miles prior Atlanta. When the airplane reaches the waypoint, he or she is aware that the airplane should attain an altitude of 11,000 feet. Selecting such a waypoint requires time and skill when using the navigational system described above because the cursor only provides a reading referenced to the present aircraft position. Accordingly, the pilot must manually determine the location on the flight plan at which the airplane is twenty miles from Atlanta. The location can be computed by the FMS in response to user inputs on a textual user interface or a control and display unit (CDU). Thus, there is a need for an apparatus for and a method of defining a waypoint referenced to a point along a flight path.

In another example involving an avionics application, pilots may receive instructions in which particular actions or preparations should be made when the airplane reaches a particular point. For example, a pilot may have altitude restrictions when the aircraft reaches a particular distance and direction from a location. More specifically, pilots may have altitude restrictions when they reach 30 miles north of Cedar Rapids, Iowa. As discussed above, conventional systems require time and skill to create a waypoint at locations which are not referenced to the airplane.

Thus, there is a need for an apparatus for and a method of creating an operator-defined waypoint a particular direction and distance from a reference point either outside or within the flight plan. There is a need for a method of and apparatus for generating waypoints on aircraft navigational systems which are consistent with air traffic controller (ATC) phraseology. Further still, there is a need for an apparatus for and method of selecting a reference point or reference map object before creating a pilot-defined waypoint. Even further still, there is a need for an apparatus for and method of providing a textual readout in an along-track-distance format if the cursor or symbol is close to the flight plan or in a place/bearing/distance format if the cursor or symbol is away from the flight plan. Even further still, there is a need for an apparatus for and a method of automatically selecting the along-track-distance format or place/bearing/distance format depending upon the proximity of the symbol or cursor to the navigation plan.

SUMMARY OF THE INVENTION

An embodiment relates generally to a navigation system for an operator of a vehicle. The navigation system includes a display, a user interface, and electronic circuitry. The electronic circuitry is coupled to the user interface and the display. A reference point is selectable via the user interface. The display provides a textual reading related to a position of a symbol on the display with respect to the reference point. The position of the symbol is controlled via the user interface.

Another embodiment relates to a method of providing an operator-defined waypoint on a navigational display within a vehicle. The method includes steps of selecting a reference point on a navigational plan and displaying a reading related to a position of a symbol used to define the waypoint with respect to the reference point. The navigational plan is provided on the navigational display.

A further embodiment relates to a graphical flight management system for use in aircraft. The graphical flight management system includes means for displaying a flight plan, means for selecting a waypoint, and means for providing on the means for displaying a reading related to a position of a symbol used to select the waypoint with respect to a reference point.

Yet another embodiment relates to visual feedback for user actions and controls related to the creation of operator-defined waypoints on an interactive navigational map.

BRIEF DESCRIPTION OF THE DRAWINGS

Exemplary embodiments will be described hereafter, wherein like numerals denote like elements, and.

DETAILED DESCRIPTION OF THE PREFERRED EXEMPLARY EMBODIMENTS

Navigational systems are discussed below with reference to an exemplary embodiment related to a flight management system (FMS) for an aircraft. However, principles of the present invention can be applied in various applications which utilize mobile platforms. Mobile platforms, such as, helicopters, trains, automobiles, ships, boats, and other vehicles can utilize a navigational system according to the principles of the present invention. The following description with reference to FIGS. 1–12 applies to all types of navigation systems and provides details with respect to navigation systems embodied as avionic graphical systems which can create pilot-defined waypoints.

Figure 1:
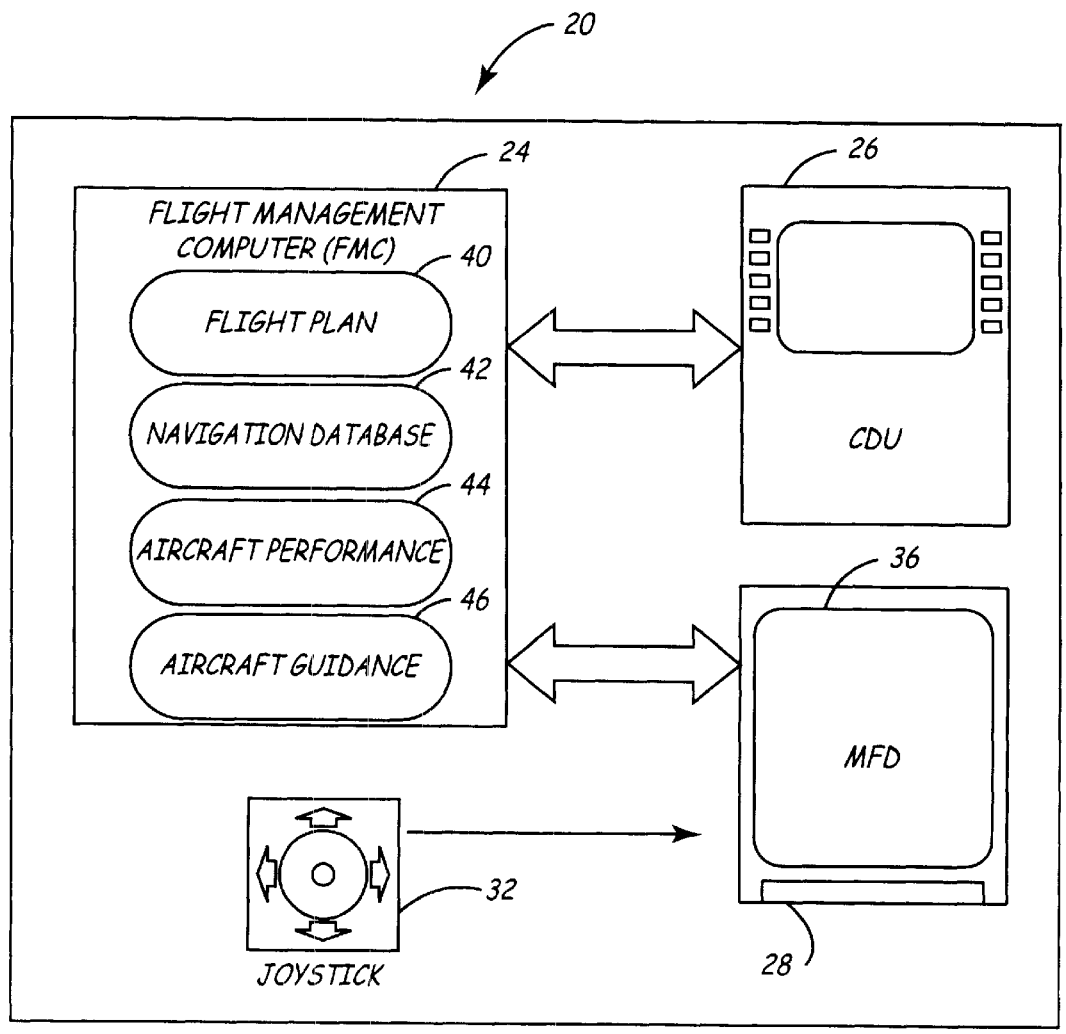
FIG. 1 is a general block diagram of a navigational system embodied as a flight management system (FMS)

With reference to FIG. 1, a navigation system is embodied as a flight management system 20. Flight management system (FMS) 20 includes a flight management computer 24, a control and display unit 26, a multi-function display 28, and a user input device 32. Flight management computer (FMC) 24 performs a number of functions associated with the operation of a mobile platform such as an aircraft. System 20 can include electronic circuitry, such as, analog or digital LCDs, CRTs, computer, processors, ASICs, dedicated circuits, sensors, etc. for implementing the various operations described below. System 20 operates software and responds to user input device 32 to provide a graphical user interface that allows the user to communicate with system 20.

Flight management computer 24 can include storage for a navigation plan embodied as a flight plan database 40, navigation database 42, an aircraft performance module 44, and an aircraft guidance module 46. Flight management computer 24 is coupled to control and display unit 26 and multi-function display 28. Computer 24 can utilize flight plan database 40, database 42, module 44 and module 46 to provide visual indicia on unit 26 and display 28 related to flight parameters. In particular, computer 24 can provide a screen on display 28 which shows a map generated with information from databases 40 and 42 and modules 44 and 46. The present position of the aircraft can be shown on the map along with other flight parameters.

In system 20, user input device 32 can be coupled to flight management computer 24 and/or multi-function display 28. Control and display unit 26 can include an alphanumeric interface for editing the flight plans, such as, database 40. The alphanumeric interface can include a screen or display as well as keys and other devices for inputting data.

Multi-function display 28 includes a display 36. Display 36 can be a CRT, LCD, or other visual device and provides a graphical representation of a navigation plan such as a flight plan. Generally, the flight plan is provided on display 36 as a solid line including various points represented by symbols such as rectangles, triangles, circles or other symbols. An airplane symbol is typically situated in the center of the display 36 representative of the present position of the airplane. The maps and visual indicia on display 36 are described below with reference to FIGS. 5–9 as a screen. Display 28 can include an alpha-numeric or other user interface.

User input device 32 can be any device providing information to multi-function display 28 or computer 24. Interface 32 can be integral with display 28, unit 26 or computer 24 or may be a separate device. User input device 32 can include a joystick, mouse, keypad, touch pad, or other data entry device. Preferably, a symbol or cursor can be manipulated on screen 36 via user input device 32 for entry of and editing of the flight plan on display 36. The cursor preferably allows reference points and operator-defined waypoints to be entered on display 36. The cursor can be an arrow, an X, a circle, a rectangle, or any symbol for positioning and selecting reference points and operator-defined waypoints.

Figure 2:
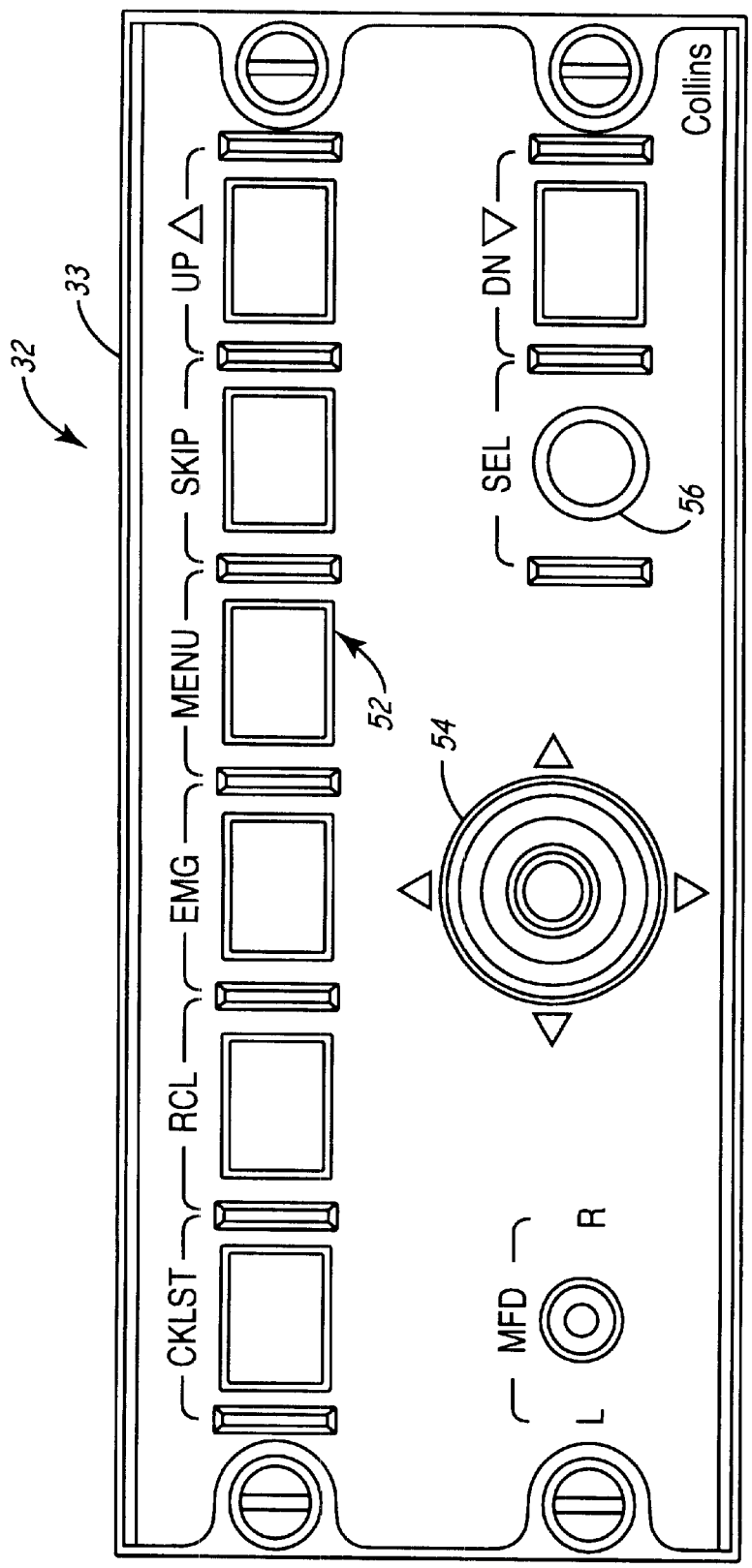
FIG. 2 is a planar front side view of a user input device embodied as a cursor control panel for the navigational system illustrated in FIG. 1.

With reference to FIG. 2, user input device 32 can be embodied as a CCP-4000 Cursor Control Panel 33 manufactured by Rockwell Collins. Cursor control panel 33 includes a set of keys 52, a joystick 54, and a select button 56.

Figure 3:
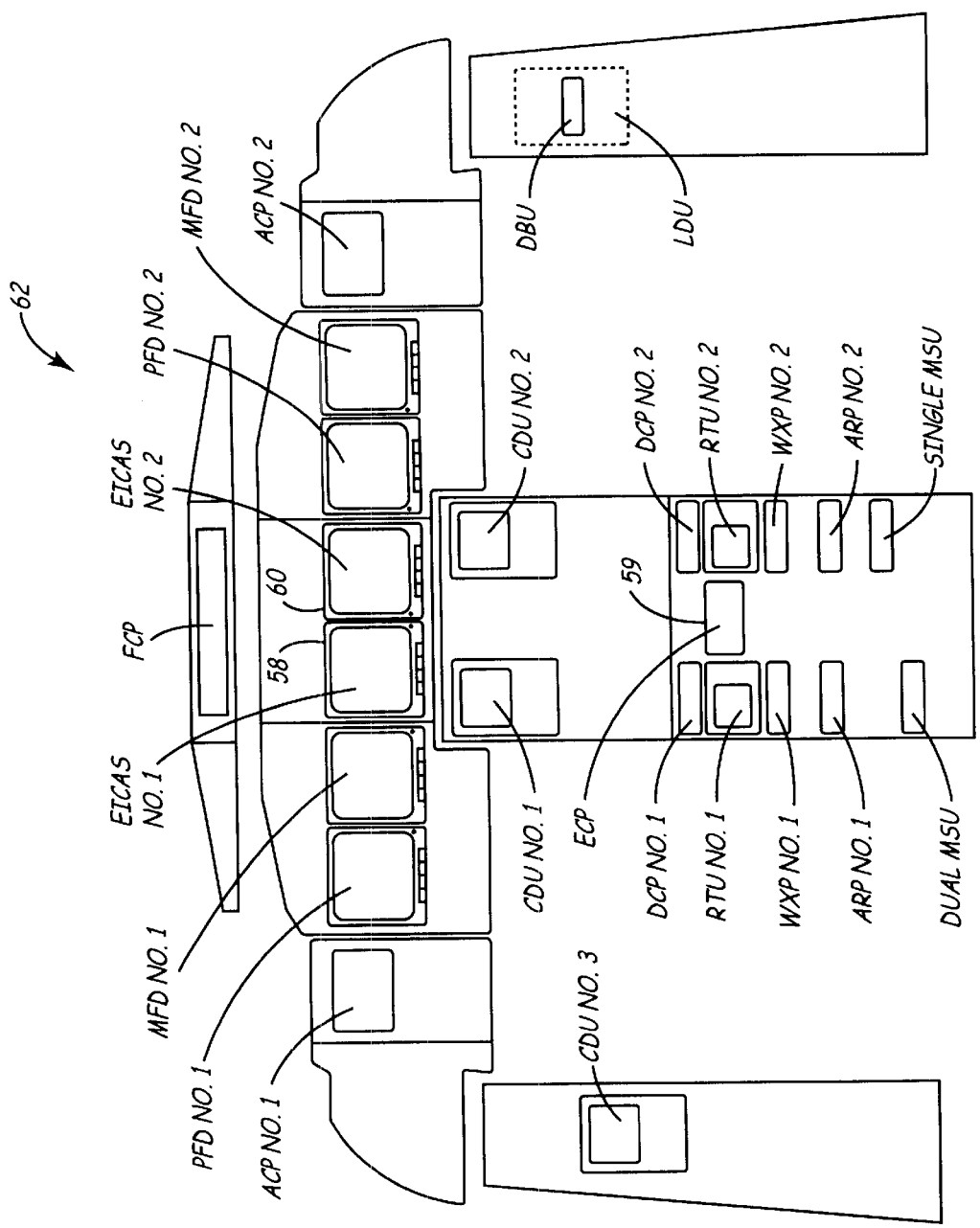
FIG. 3 is a block diagram of an avionics system including a user input device embodied as an EICAS Control Panel for use in the system illustrated in FIG. 1.

With reference to FIG. 3, user input device 32 can be embodied as an EICAS (Engine Indication Crew Alert System) control panel 59 associated with displays 58 or 60 shown as part of a Collins Pro Line 4 avionics system 62 manufactured by Rockwell Collins. Accordingly, user input device 32 can be implemented in a variety of fashions for providing data to navigation system 20.

Figure 8:
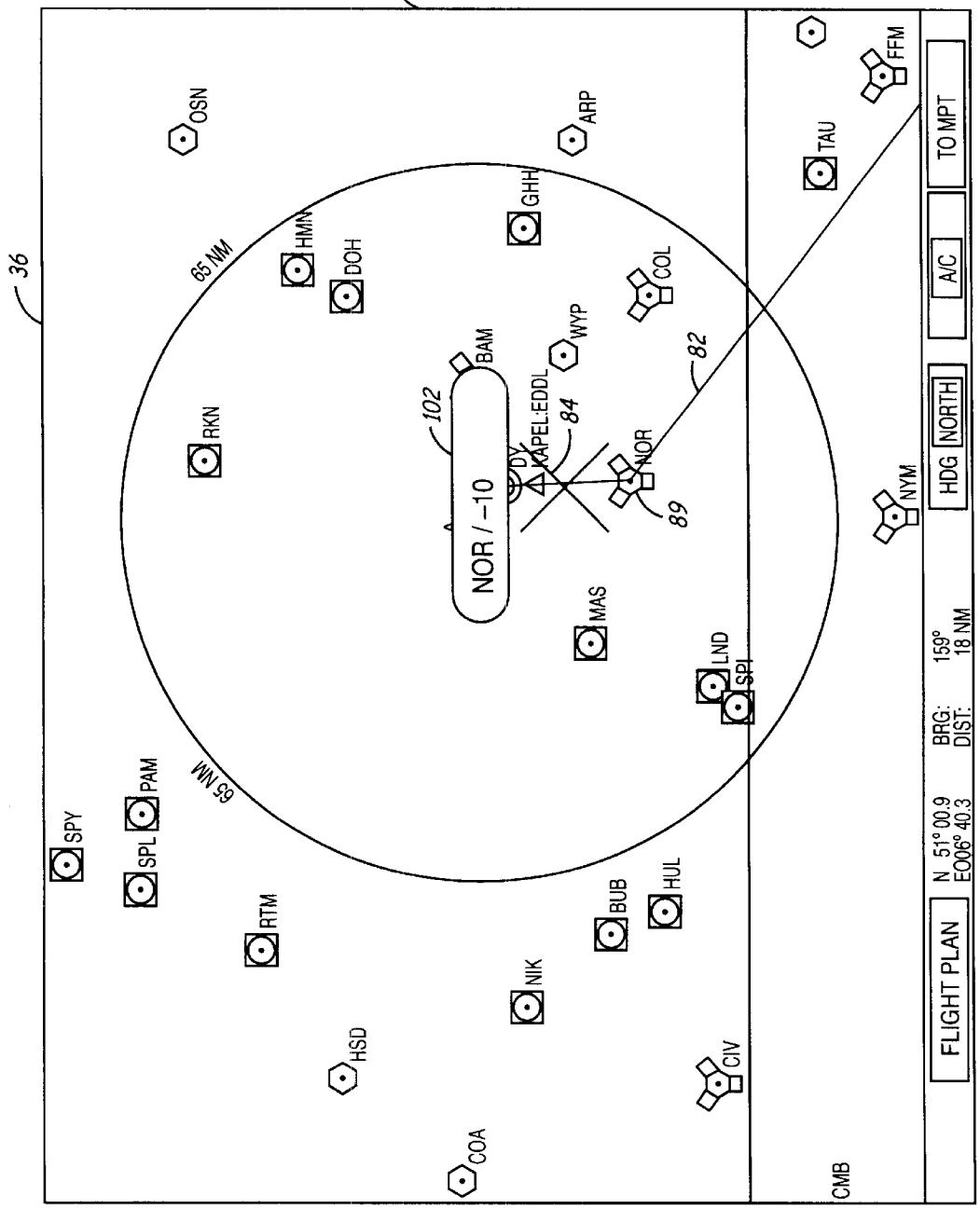
FIG. 8 is a graphical representation of a screen provided on a display for use in the system illustrated in FIG. 1, showing creation of an operator-defined waypoint on the navigational plan.
Figure 9:
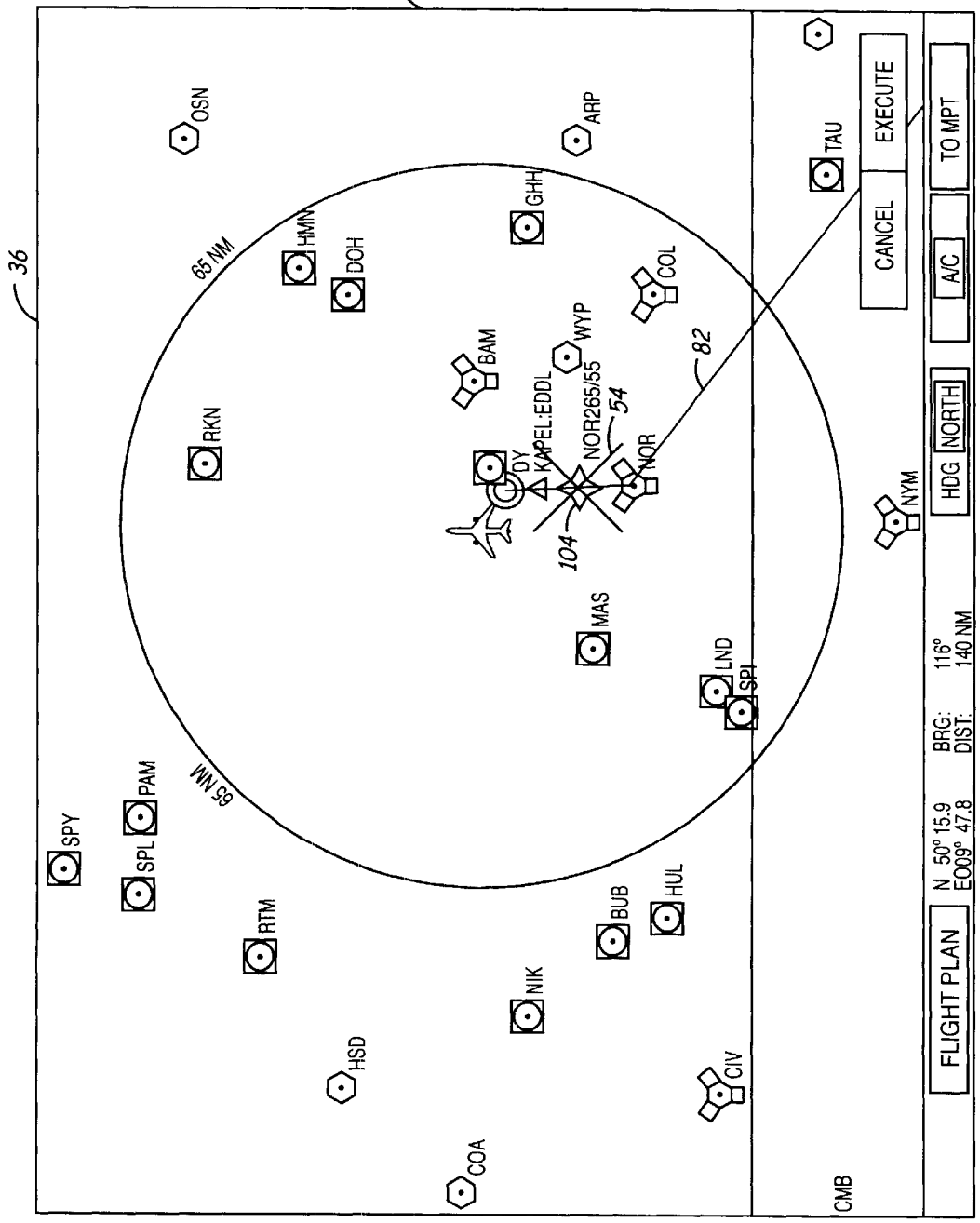
FIG. 9 is a graphical representation of a screen for use in the system illustrated in FIG. 1, showing insertion of the operator-defined waypoint of FIG. 8 on the navigational plan.

The operation of system 20 is described with reference to exemplary screens provided on display 36 with reference to FIGS. 4–10. FIGS. 4–7 demonstrate the selection of a waypoint away from a flight plan. FIGS. 8–9 show the selection of a waypoint on a flight plan.

Figure 4:
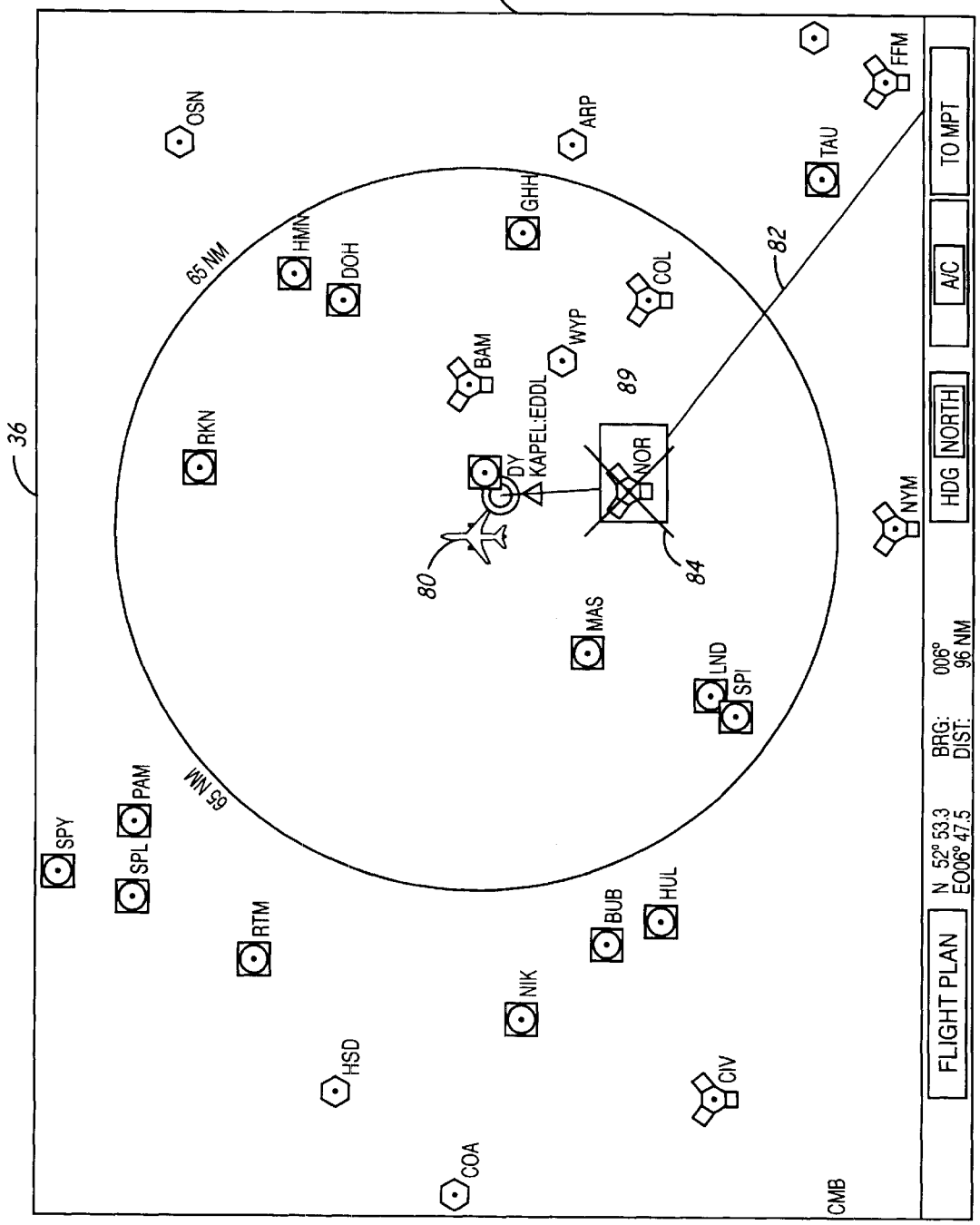
FIG. 4 is a graphical representation of a screen provided on a display for use in the system illustrated in FIG. 1, showing the selection of a reference point.

In FIG. 4, display 36 includes a screen 76 which shows a map of graphical representation of the surroundings of an airplane. The present position of the airplane is represented by an airplane-shaped symbol 80 in the center of screen 76.

Screen 76 also includes various locations indicated by shapes such as squares, circles, and triangles. The locations can include labels which exhibit three-character textual readings. Other locations can be indicated by a combination of shapes, such as, a circle and three squares. Computer 24 and display 28 can utilize databases 40 and 42 and modules 44 and 46 to provide the representations of the aircraft and locations on screen 76.

A navigation plan such as a flight plan 82 is represented by a solid line on screen 76. A circle having a circumference delineated by a solid line represents a 65 nautical mile (nm) range and is centered over symbol 80. Alternatively, other range settings can be utilized (e.g., 20 nm, 40 nm, 80 nm, etc.)

A symbol or cursor 84 in the form of an X is utilized to select various elements on screen 76. In FIG. 4, an operator or pilot via user input device 32 selects a reference point along flight plan 82 by manipulating symbol 84 over a specific point over flight plan 82. In this example, a pilot or navigator has manipulated cursor 84 over a reference point 89 labeled NOR on flight plan 82. Once cursor 84 is over reference point 89, the pilot can use a select button (such as select button 56 on user input device 32 shown in FIG. 2) to select point 89 as a reference point. Although point 89 is on plan 82, the pilot can select a point which is located anywhere on screen 76. For example, point 89 can be any object on screen 76. As discussed below, the along-track-distance format as opposed to the place/bearing/distance format is supported when point 89 is on plan 82.

Figure 5:
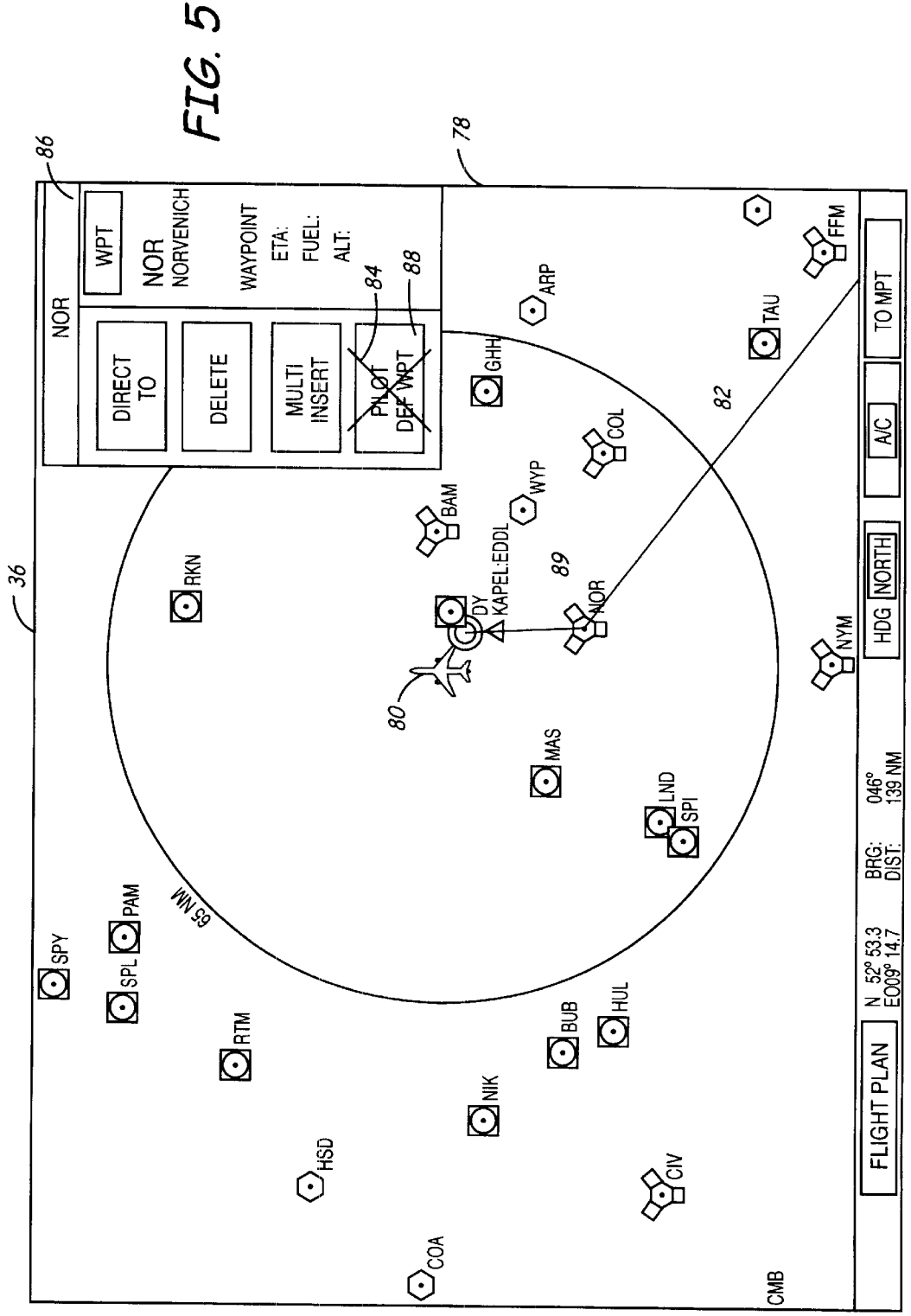
FIG. 5 is a graphical representation of a screen provided on a display for use in the system illustrated in FIG. 1, showing an option box for the creation of an operator-defined waypoint.

In FIG. 5, a screen 78 is provided on display 36. After reference point 89 has been selected, a pop-up menu 86 is provided on screen 78. Pop-up menu 86 includes several user options, including a delete option, a multi-user option, and a direct to option. The several user options are examples of functions that can be called by pilots to perform flight plan manipulations. These several user options are standard FMS commands and are beyond the scope of this application.

Pop-up menu 86 includes a pilot-defined waypoint selection box 88. A pilot can choose to insert a pilot-defined waypoint by placing cursor 84 on box 88 and pressing button 56. Generally, system 20 is in a drag-from-point-to-anywhere mode once box 88 is selected.

Figure 6:
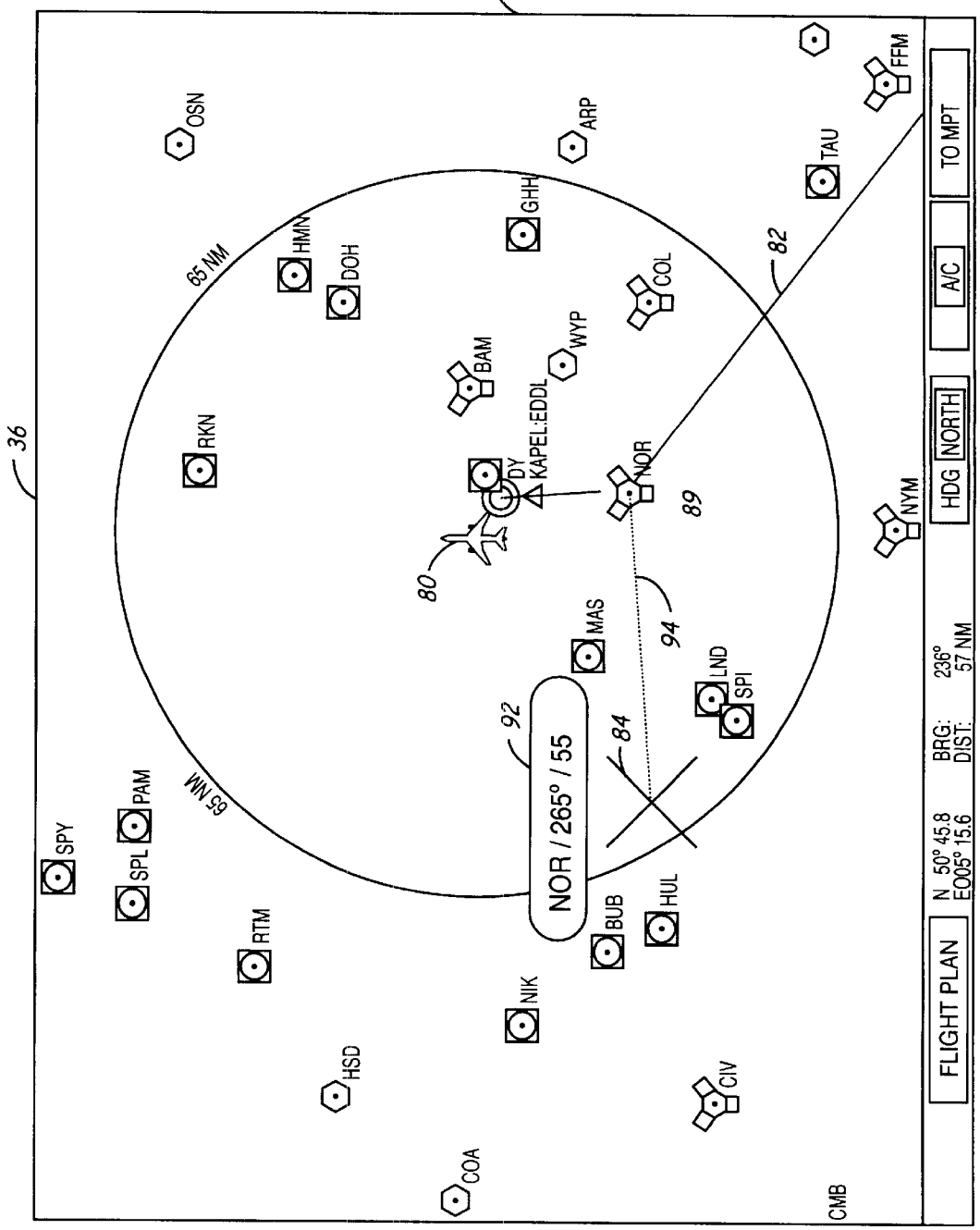
FIG. 6 is a graphical representation of a screen provided on a display for use in the system illustrated in FIG. 1, showing creation of an operator-defined waypoint away from the navigational plan.

In FIG. 6, a screen 97 is provided on display 36. After box 88 is selected, a dashed (dotted), rubberized line is provided between reference point 89 and cursor 84. The dashed line is rubberized in that the line maintaining its connection between point 89 and cursor 84 as cursor 84 moved about screen 97. A text box or pop-up label 92 provides a textual reading. The textual reading indicates a direction and radial distance from reference point 89 to cursor 84 (place/bearing/distance mode). Referencing locations relative to other locations, such as, in place/bearing/distance format or along track-distance format, is ATC compatible phraseology. Preferably, the direction is provided in degrees wherein zero degrees is north and radial distance is provided in nautical miles. The identification of the reference point can also be provided in label 92 as shown in FIG. 6. Label 92 preferably includes the letters NOR referring to reference point NOR (reference point 89).

According to one alternative embodiment, unit 26 or display 36 may include a speaker. As cursor 84 is moved about screen 97, unit 26 or display 36 may be configured to generate an audible response indicating one or more of the contents of label 92. The audible response may further be in addition to label 92. Further, the audible response can be utilized to confirm the appropriate placement of the waypoint.

Advantageously, cursor 84 is referenced from any point on screen 97 to reference point 89 as cursor 84 is moved across the screen. Thus, according to one advantage, cursor 84 is capable of being referenced to locations other than airplane symbol 80. Preferably, if cursor 84 is away from flight plan 82, a direction and radial distance format is used in label 92. Label 92 preferably follows cursor 84 as it is moved across screen 92.

Figure 7:
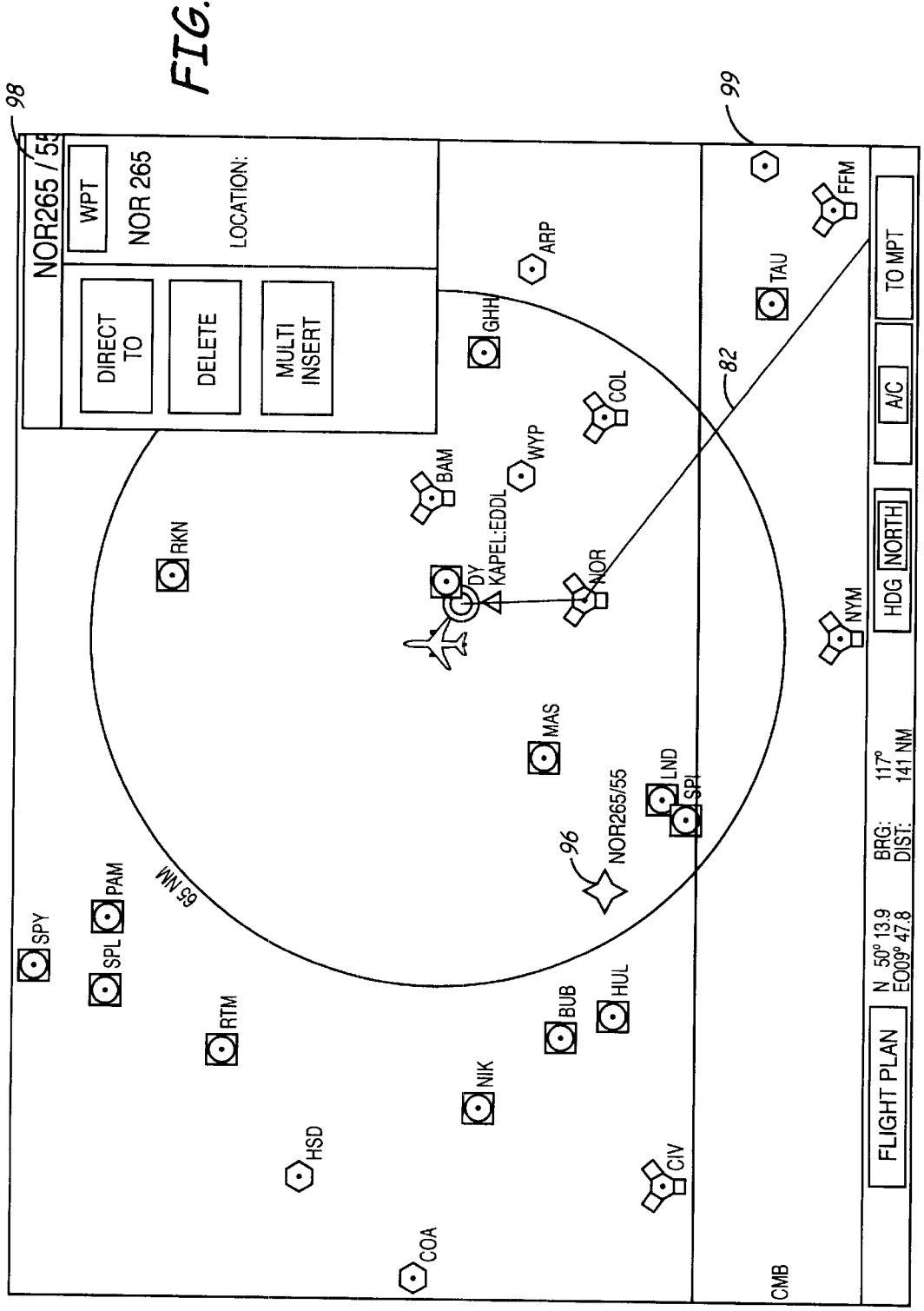
FIG. 7 is a graphical representation of a screen provided on a display for use in the system illustrated in FIG. 1, showing a procedure box for the operator-defined waypoint illustrated in FIG. 6.

In FIG. 7, a screen 99 is provided on display 36. A pilot can select an operator-defined point 96 associated with the position of cursor 84 in FIG. 6 by pressing button 56. Waypoint 96 can include a pop-up label 92 including the direction and distance from reference point 89 (FIG. 6).

Preferably, the label for reference point 96 includes a textual reading derived from the reference point, the bearing and the distance to that reference point. Waypoint 96 shows the reference "NOR 265/55" which indicates that waypoint 96 is 55 nautical miles in a direction of 265 degrees from reference point NOR (point 89). After point 96 is selected, a pop-up menu 98 can be generated to provide selections for the pilot with respect to point 96. Pop-up menu 98 includes several user options, such as, delete, direct to, and multi-user. These several user options are explained with reference to FIG. 5.

In FIG. 8, a screen 100 is provided on display 36. Contrary to the example discussed in FIGS. 4–7, cursor 84 is disposed on or close to flight plan 82.

As cursor 84 is moved on flight plan 82, a pop-up label 102 shows a distance from reference point 89 along flight plan 82. For example, pop-up label 102 indicates that cursor 84 is a distance of 10 nautical miles from point 89 along flight plan 82 (along-track-distance mode).

In FIG. 9, a screen 103 is provided on display 36. When the pilot pushes button 56 while viewing screen 100 (FIG. 8), a waypoint 104 is created. Waypoint 104 includes a label showing the distance along flight plan 82 from reference point 89. As shown, waypoint 104 includes the label "NOR/–10". The negative sign indicates that waypoint 104 will be passed before reference point 89 if travel is continued along plan 82. Once selected, waypoint 104 is inserted into flight plan 82.

Figure 10:
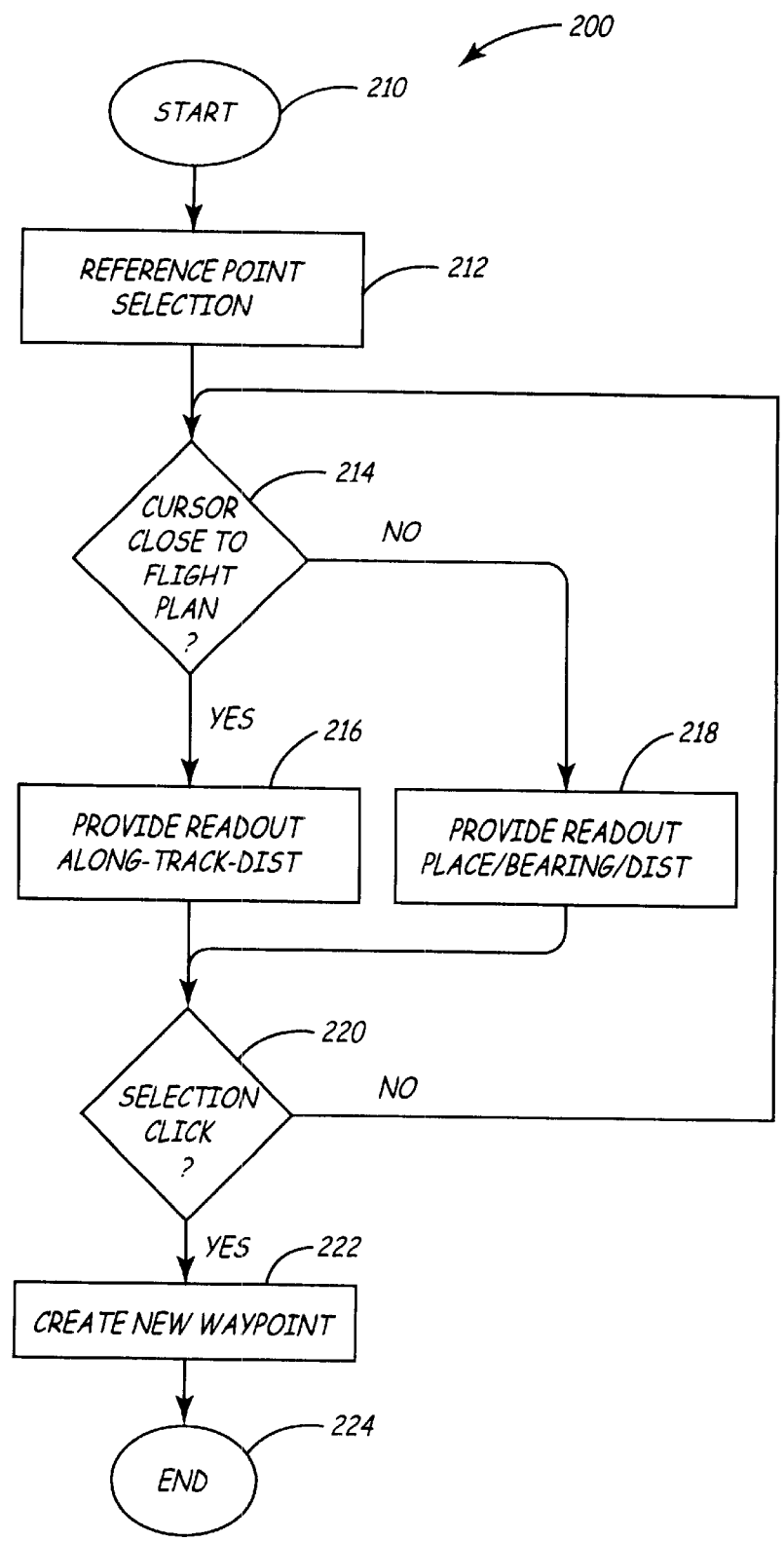
FIG. 10 is a flowchart of the operation of the system illustrated in FIG. 1, showing the operator-defined waypoint operation.

In FIG. 10, a flowchart 200 shows the operation of system 20. At a step 210, the selection of a pilot-defined waypoint process is started at a screen 76 (FIG. 4). At screen 76, a reference point is selected at a step 21 2 (FIG. 5).

At a step 214, system 20 determines if cursor 54 is close to flight plan 82. For example, system 20 determines if cursor 54 is within one quarter inch of flight plan 82. If cursor 54 is within one quarter inch of flight plan 82, a reading such as label 102 is provided in along-track-distance format at a step 216 (FIG. 8). If cursor 54 is not close to flight plan 82, (e.g., not within one quarter inch), a reading such as label 92 (FIG. 6) is provided in place/bearing/distance format in a step 218. System parameters and application requirements can affect the definition of "close to" or "near" plan 82. For example, as maps or displays are larger or represent greater areas, the definition of close may change accordingly.

At a step 220, system 20 determines if button 56 has been pushed. If button 56 has been pushed, a new waypoint such as waypoint 96 (FIG. 7) or waypoint 104 (FIG. 9) is generated at a step 222. After step 222, operation 200 ends at a step 224.

Figure 11:
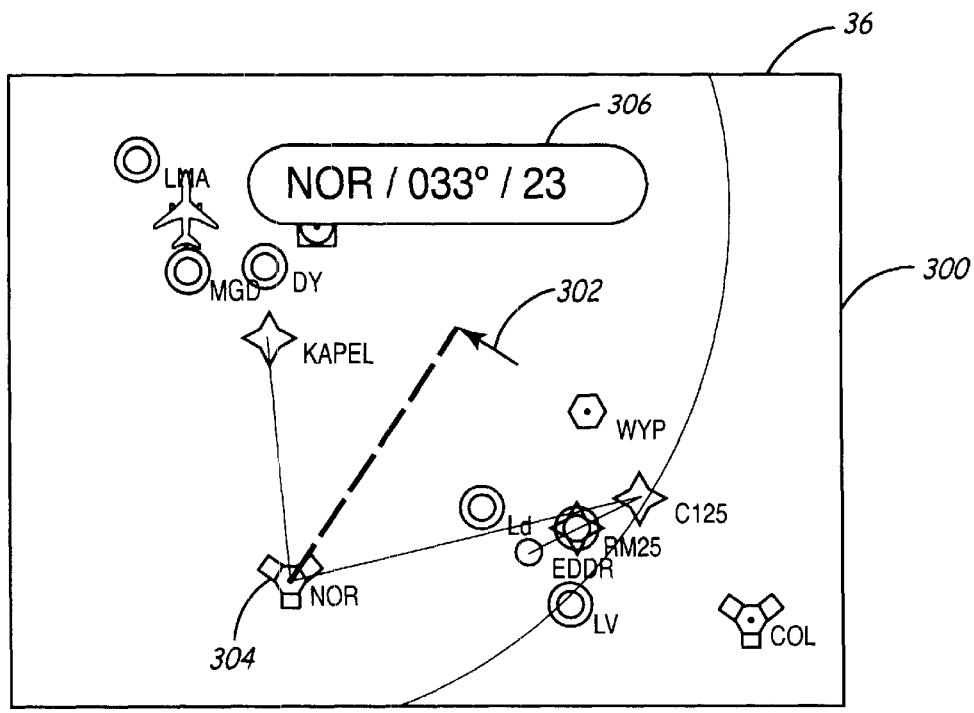
FIG. 11 is a graphical representation of a screen provided on a display for use in the system illustrated in FIG. 1, showing the selection of an operated-defined waypoint which is not along a navigation path.

In FIG. 11, a general block diagram of a graphical representation 300 on display 36 is shown. On representation 300, an arrow-shaped cursor 302 is connected by a dotted, rubberized line from a reference point 304. A pop-up label 306 is provided which indicates a position of cursor 302 in a place/bearing/distance format.

Figure 12:
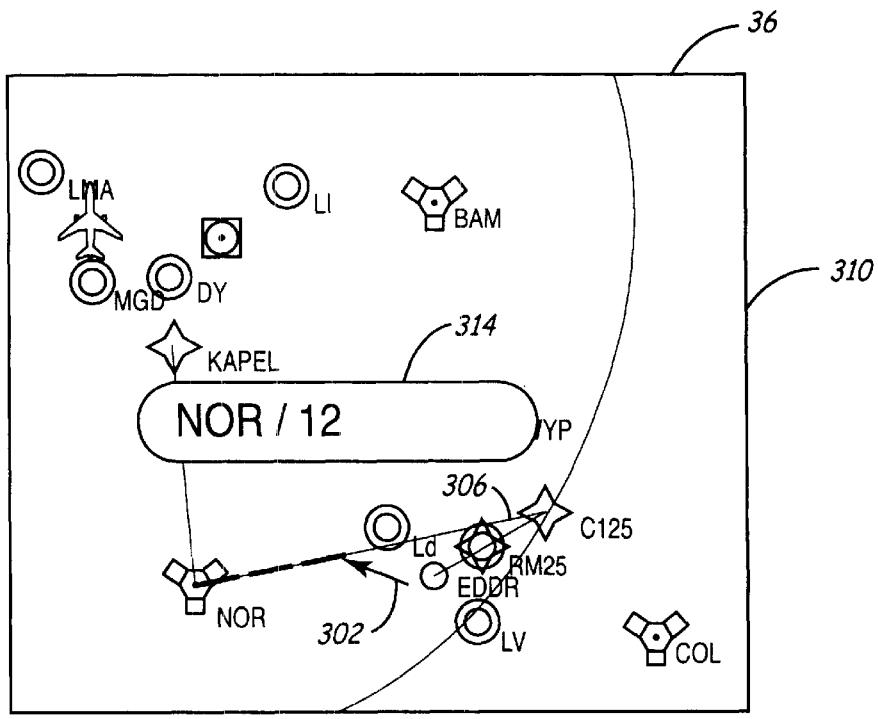
FIG. 12 is a graphical representation of a screen for use in the system illustrated in FIG. 1, showing selection of an operator-defined waypoint on a navigation path.

In FIG. 12, a general block diagram of a graphical representation 310 on display 36 is shown. On representation 310, cursor 302 is along flight path 306. A pop-up label 314 is provided which indicates a position of cursor 302 in along-track-distance format.

It is understood that, while preferred exemplary embodiments of the present invention are described, they are for the purpose of illustration only. The method and apparatus of the present invention is not limited to the precise details and conditions disclosed. For example, although specific screen displays and symbols are shown, other shapes and displays can be utilized. Various changes may be made to the details disclosed without departing from the spirit of the invention which is defined by the following claims.

What is claimed is:

1. A navigation system for an operator of a vehicle, the navigation system comprising:
    a display;
    a user input device; and
    electronic circuitry coupled to the user interface and the display, the electronic circuitry providing indicators on the display relating to a flight plan, a reference point being selectable via the user interface, the display providing a textual reading related to a position of a symbol on the display with respect to the reference point, the position of the symbol being controlled via the user interface, the textual reading providing only a distance along the flight plan from the reference point if the symbol is positioned substantially on the flight plan and the textual reading comprising a direction and a distance from the reference point to the symbol when the symbol is not positioned substantially on the flight plan.

2. The navigation system of claim 1, wherein the navigation system is a flight management system (FMS).

3. The navigation system of claim 1, wherein the textual reading is provided on a pop-up label on the display.

4. The navigation system of claim 1, wherein the position of the symbol is controlled via a cursor.

5. The navigation system of claim 4, wherein a rubberized line connects the reference point and the cursor.

6. The navigation system of claim 1, further comprising:
    a speaker configured to provide an audible indication of the position of the symbol.

7. The navigation system of claim 6, wherein the audible indication is utilized to confirm the placement of the symbol.

8. A method of providing an operator-defined waypoint on a navigational display within a vehicle, the method comprising:
    selecting a point on a navigational display having indicators representative of a navigational plan;
    deciding whether the selected point is substantially located on the navigational plan; and
    displaying a reading related to a position of a symbol used to define the selected point with respect to a reference points the reading providing only a distance along the navigational plan from the reference point if the selected point is substantially located on Fe navigational plan and the reading comprising a direction and a distance from the reference point to the selected point if the selected point is not substantially located on the navigational plan.

9. The method of claim 8, wherein the reading is compatible with air traffic controller phraseology.

10. The method of claim 8, wherein the reading is a textual reading provided on a pop-up label.

11. The method of claim 8, wherein the selecting step utilizes a mouse or a joystick.

12. The method of claim 8, further comprising:
    moving a cursor to the selected point on the display.

13. The method of claim 12, further comprising:
    providing a rubberized line on the display from the reference point to the cursor.

14. The method of claim 8, further comprising:
    providing an audible indication of the location of the selected point.

15. A graphical flight management system for use in aircraft, the graphical flight management system comprising:
    means for displaying a flight plan;
    means for selecting a waypoint; and
    means for providing on the means for displaying a textual reading related to a position of a symbol used to select the waypoint with respect to a reference point, the textual reading providing only a distance along the flight plan from the reference point if the symbol is positioned substantially on the flight plan and the textual reading comprising a direction and a distance from the reference point to the symbol when the symbol is not positioned substantially on the flight plan.

16. The graphical flight management system of claim 15, wherein the reading is compatible with air traffic controller phraseology.

17. The graphical flight management system of claim 15, wherein the reading is provided on a pop-up label.

18. The graphical flight management system of claim 15, wherein the reference point is selected via the means for selecting the waypoint.

19. The graphical flight management system of claim 15, wherein the position of the symbol is controlled via a cursor.

* * * * *